No. 727,742. PATENTED MAY 12, 1903.
W. G. BROWNE.
CULINARY UTENSIL.
APPLICATION FILED OCT. 2, 1901.
MODEL.
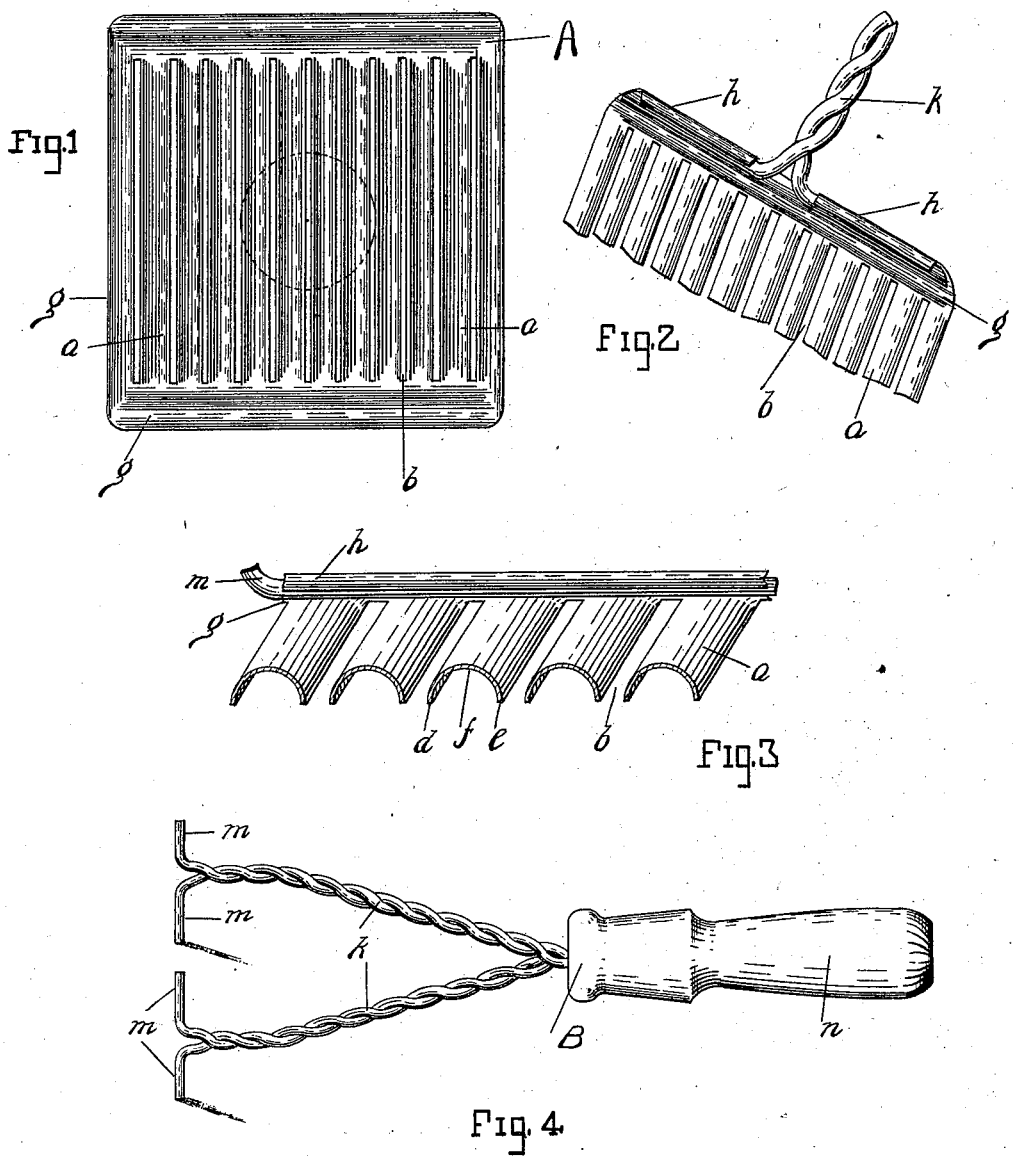
WITNESSES:
C. H. Bertholf
F. P. Wentworth
INVENTOR
William G. Browne,
BY Nathaniel L. Frothingham
ATTORNEY No. 727,742. Patented May 12, 1903.

UNITED STATES PATENT OFFICE.

WILLIAM G. BROWNE, OF KINGSTON, NEW YORK.

CULINARY UTENSIL.

SPECIFICATION forming part of Letters Patent No. 727,742, dated May 12, 1903.

Application filed October 2, 1901. Serial No. 77,257. (Model.)

*To all whom it may concern:*

Be it known that I, WILLIAM G. BROWNE, a citizen of the United States, residing at Kingston, in the county of Ulster and State of New York, have invented certain new and useful Improvements in Culinary Utensils, of which the following is a specification, reference being had therein to the accompanying drawings.

My invention relates to a culinary utensil for reducing potatoes or other similar vegetables to a creamy consistency. With the pestle-like utensil now ordinarily in use considerable time is required to accomplish this, and it also calls for considerable muscular exertion. As this method is both tedious and laborious, it quite frequently happens that many uncrushed particles or lumps are permitted to remain therein and the quality of the food as served is materially affected.

The object of my invention is to obviate these difficulties by providing a utensil adapted to this purpose, which may be used to easily, quickly, and effectively reduce potatoes or other similar vegetables to the desired consistency without the danger of the presence of such uncrushed particles or lumps in the finished food.

A further object is to provide a utensil to accomplish this result which will be capable of being readily cleansed, which will be simple in construction, and which will be inexpensive to manufacture.

The invention consists in the novel features of construction hereinafter set forth and described, and more particularly pointed out in the claims hereto appended.

Referring to the accompanying drawings, Figure 1 is view looking upward at the bottom of the base-plate. Fig. 2 is a detailed view showing the manner of attaching the handle to the base-plate. Fig. 3 is a detail view, enlarged, showing the construction of the combined cutter and crusher blades; and Fig. 4 is a view in perspective of the handle detached from the base-plate.

Like letters refer to like parts throughout the several views.

My improved utensil comprises two members, the base-plate A and the handle B, by means of which it is wielded. The said base-plate A is formed from a metal blank by any well-known method, as by stamping, and comprises a series of blades $a$, parallel with each other and spaced slightly apart to form between them a series of narrow slots $b$, conterminous with the adjacent blades. The blades $a$ are each formed with a longitudinal channel therein, which is open throughout the lower side of said blades to form two downwardly-projected cutting edges $d$ $e$, and between them a concave crushing-surface, as $f$, which act simultaneously upon the matter being prepared. To reinforce the blades $a$ and prevent their buckling from the strain occasioned while in use, I provide an integral rim $g$, entirely surrounding the entire series of said blades, said rim being similar in configuration to said blades, forming a continuous channel throughout the entire rim. On opposite and parallel sides of the rim $g$ are formed wings or extensions $h$ of sufficient breadth to admit of their being used to attach the handle B to the base-plate A, as hereinafter more fully described.

The blades $a$, rim $g$, and wings or extensions $h$ are all capable of being and preferably are formed from a single metal blank and at one operation.

The handle B is comprised of wire supports, as $k$, having extensions $m$ $m$ on the lower ends thereof, which are adapted to be engaged and retained by having the wings $h$ crimped thereover and may be secured in the proper relation permanently by soldering or other desirable and well-known means. The supports $k$ carry the handle $n$, which may be of any desired style and secured in any desired manner.

The operation of the utensil in so far as has not already been described is as follows: The potatoes or other vegetables having been cooked until prepared for maceration and placed in a proper receptacle, the base-plate A by means of the handle B is pressed downwardly thereon, the cutting edges $d$ $e$ gripping and holding the vegetable until the crushing-surface $f$ contacts with and mashes it. As they are crushed by the repetition of this operation, the entire mass is repeatedly forced upward through the slots $b$, with the exception of uncrushed particles, which are caught by the said cutting edges and so reduced in size as to ultimately be forced therethrough. The repeated action of the blades *a* on the lumps and the crushed mass being repeatedly forced through the narrow slots between them tends to quickly and effectively reduce the vegetables to the desired consistency, and the peculiar construction and arrangement of the combined cutter and crusher blades greatly facilitates this operation.

The blades *a* are designedly so formed that there are no sharp angles wherein the food can accumulate, and consequently the utensil may be readily cleansed, an essential matter to be considered in connection with a utensil of this character. As the utensil is comprised of but two component elements, the cost of assembling is reduced to a minimum, and the base-plate being struck from a metal blank and its constituent members being formed at one operation and by the means of well-known machinery the total cost of production renders the finished product inexpensive.

It is not my intention to limit the invention to the precise form herein shown and described, as it is obvious that there may be many variations as to the general contour of the base-plate A and corresponding changes in the arrangement of the means whereby the combined cutter and crusher blades are reinforced and the handle attached thereto without departing from the spirit of my invention.

Having described the invention, what I claim as new, and desire to have protected by Letters Patent, is—

1. In a culinary utensil of the class described, a series of blades parallel with each other and spaced apart to permit the passage of crushed matter therebetween, each blade being formed with a channel therein to produce two downwardly-projected cutting edges and an integral crushing-surface between them, and means whereby a handle may be secured thereto, in combination with a handle.

2. In a culinary utensil of the class described, a base-plate formed of a metal blank comprising a series of blades, parallel with each other and spaced apart to permit the passage of crushed matter therebetween, each blade being formed with a channel therein to produce two downwardly-projected cutting edges and an integral crushing-surface between them, and wings or extensions on opposite sides of said plate, in combination with a handle having supports extending to opposite sides of said plate and extensions thereon adapted to be engaged and retained by having said wings or extensions crimped thereover.

In witness whereof I have hereto affixed my signature, this 30th day of September, 1901, in the presence of two witnesses.

WILLIAM G. BROWNE.

Witnesses:
FRANK W. BROOKS,
CHARLES W. WALTON.